United States Patent [19]

Takano et al.

[11] Patent Number: 4,510,113

[45] Date of Patent: Apr. 9, 1985

[54] BELT SLEEVE MANUFACTURING METHOD AND APPARATUS

[75] Inventors: Hiroshi Takano; Hiroshi Yokoyama, both of Hyogo; Takahide Mizuno, Kobe, all of Japan

[73] Assignee: Mitsuboshi Belting Ltd., Kobe, Japan

[21] Appl. No.: 478,444

[22] Filed: Mar. 24, 1983

[30] Foreign Application Priority Data

Mar. 25, 1982 [JP] Japan .................................. 57-48292

[51] Int. Cl.³ .......................... B29C 1/14; B29C 1/16; B29D 29/02
[52] U.S. Cl. .................................... 264/257; 156/138; 156/140; 264/324; 264/325; 425/28 B; 425/40; 425/47; 425/395; 425/DIG. 5
[58] Field of Search ............... 264/324, 257, 258, 103, 264/DIG. 65, 325; 425/28 B, 28 D, 40, 517, 520, 394, 395, 47, DIG. 5; 156/138, 140, 141, 137

[56] References Cited

U.S. PATENT DOCUMENTS

| 2,381,395 | 8/1945 | Brown | 425/40 |
| 2,812,008 | 11/1957 | Bright | 264/257 |
| 3,505,447 | 2/1967 | Billes | 425/40 |
| 3,645,655 | 2/1972 | Beneze | 425/395 |
| 3,897,291 | 7/1975 | Hoback et al. | 156/138 |
| 3,934,968 | 1/1976 | Cicognani | 425/28 B |
| 4,106,966 | 8/1978 | Brooks | 156/138 |

FOREIGN PATENT DOCUMENTS

| 1440604 | 4/1966 | France | 425/47 |
| 22101 | 6/1971 | Japan . | |
| 135056 | 12/1974 | Japan . | |
| 139875 | 4/1975 | Japan . | |
| 71181 | 6/1978 | Japan . | |
| 875283 | 8/1961 | United Kingdom | 425/28 B |
| 1225667 | 3/1971 | United Kingdom . | |
| 891472 | 12/1981 | U.S.S.R. | 425/47 |

Primary Examiner—James Lowe
Attorney, Agent, or Firm—Wood, Dalton, Phillips, Mason & Rowe

[57] ABSTRACT

A method and apparatus for forming belt sleeves having grooves provided in either or both of the inner and outer surfaces thereof. The manufacture includes the provision of a preform laminate on an inner mold and the forcible urging of a constrictable outer mold radially against the laminate at elevated temperatures so as to effect curing of the rubber of the laminate in accurate conformity to the grooved configuration of the inner and outer molds. The entire assembly is carried on a central support post. Pressure plates are provided for urging the constrictable outer mold radially inwardly as the result of threaded advance of nuts on the central post. The grooves in the mold surfaces may selectively be arranged to extend parallel or circumferentially of the central axis of the post as desired to form either longitudinally or transversely extending ribs, grooves, etc., in the formed sleeve belt.

18 Claims, 7 Drawing Figures

BELT SLEEVE MANUFACTURING METHOD AND APPARATUS

DESCRIPTION

1. Technical Field

This invention relates to the forming of belt sleeves such as for use in the manufacture of power transmission belts and the like.

2. Background Art

In one conventional form of drive belt, ribs or cogs are provided on the inner surface thereof, such as for cooperation with complementary grooved pulleys of the drive system.

In another form of conventional belt, ribs are provided in the outer surface of the belt, such as for providing improved dependability thereof.

In one form, the grooves run longitudinally of the belt in one surface, and transversely thereof in the opposite surface.

Where the grooves run transversely of the belt in both the inner and outer surfaces, different configurations are utilized, such as a configuration wherein the grooves are aligned with each other, and another configuration wherein the grooves are offset from each other longitudinally of the belt.

In another form of such grooved belt construction, a fabric covering is provided on the grooved surface. It has been a difficult problem in the belt manufacturing art to provide accurate forming of the fabric cover to the desired grooved configuration.

One proposed method of manufacture of such belts formed of polyurethane with teeth or grooves on at least one surface thereof is disclosed in Japanese Patent Publication No. 22101/1971. As disclosed therein, a cover fabric, a tension member, a rubber layer, and another fabric cover layer are laminated one over another onto a grooved inner mold. A grooved cylindrical matrix formed of rubber is placed concentrically about the inner mold and after curing, the rubber layer is pressed into the grooves of both the inner mold and grooved matrix to form projecting teeth on each of the inner and outer surfaces.

In Japanese Patent provisional publication No. 135056/1974, a method of forming belt sleeves is disclosed in which an uncured rubber sheet having molded teeth therein is placed over a grooved inner mold. The tension member is spirally wound by the sheet and an uncured rubber sheet with molded teeth is laminated thereabout. A grooved cylindrical matrix is disposed outwardly of the assembly, followed by a curing step.

In Japanese Patent provisional publication No. 71181/1978, means are provided for causing an uncured element having rubber teeth and provided with an outer cover to be laminated on the back of a toothed belt which has been cured to about 75% of its depth and which has tension cord members embedded therein. This is followed by a pressing and curing process to complete the manufacture.

In Japanese Patent provisional publication No. 139875/1975, a milled structure is disclosed having an inner mold provided with teeth on the outer circumferential surface thereof, and a plurality of bar-shaped molds which are initially set around the inner mold and then moved toward the center of the inner mold.

The known methods of manufacture of such toothed or grooved belts present a serious problem relative to the tendency of the structures to deform and thereby not have desired accurate configurations. Another problem in the known methods is the possibility of separation of the outer and inner portions of the belt from each other due to low adhesion therebetween.

DISCLOSURE OF INVENTION

The present invention comprehends an improved method and manufacture of grooved belt sleeves for use in forming grooved or cogged belts wherein a wide range of groove and cog configurations may be obtained having high configuration accuracy.

The invention comprehends the use of the method and apparatus in providing both covered and uncovered grooved belts, as desired.

More specifically, the invention comprehends the improved method of forming a belt sleeve including the steps of providing an inner mold having a radially outer surface defining a configuration for forming the inner surface of the desired belt sleeve, providing a preform comprising layers of uncured rubber, fabric, and tensile cord concentrically about the inner mold, providing end members at the axially opposite ends of the inner mold for effectively defining a molding space concentrically surrounding the inner mold in which the preform is disposed, providing in spaced concentric relationship to the inner mold a split outer mold having a radially inner surface defining a configuration for forming the outer surface of the desired belt sleeve, forcibly urging the outer mold radially inwardly to compress the preform and cause the radially inner and outer surfaces thereof to conform accurately to the mold inner and outer surfaces, and curing the preform while maintaining the urging.

In broad aspect, the invention comprehends the provision of an apparatus for forming such a belt sleeve including an inner mold having a radially outer surface defining a configuration for forming the inner surface of the desired belt sleeve, end members at the axially opposite ends of the inner mold for effectively defining a molding space concentrically surrounding the inner mold for receiving a preform formed of layers of uncured rubber, fabric, and tensile cord, a split outer mold having a radially inner surface defining a configuration for forming the outer surface of the desired belt sleeve, and means for urging the outer mold radially inwardly to compress the preform and cause the radially inner and outer surfaces thereof to conform accurately to the mold inner and outer surfaces, while concurrently curing the preform to form the desired belt sleeve.

In the novel manufacture of the present invention, a central mounting post is provided for mounting the inner mold and end members thereto.

In the illustrated embodiment, the step of urging the outer mold radially inwardly comprises a step of mounting a force transfer means to the post and forcibly urging the force transfer means against the split outer mold.

In the illustrated embodiment, a pair of such force transfer means are provided for engaging the opposite ends of the outer mold.

In the illustrated embodiment, the outer mold is preheated before being placed in concentric relationship to the inner mold.

The invention further comprehends providing an outlet passage for discharging excess rubber from the molding space as an incident of the compression of the preform.

In the illustrated embodiment, at least one of the mold surfaces is provided with means for forming projections in the confronting surface of the cured belt sleeve.

In the illustrated embodiment, the outer mold comprises a plurality of arcuate segments cooperatively defining an outer frustoconical surface. The means for urging the outer mold radially inwardly, in the illustrated embodiment, comprises means acting against the frustoconical surface.

The surfaces of the two molds may be grooved in any manner as desired to provide the desired final belt sleeve configuration in each of the inner and outer surfaces. As a result of the substantial pressure applied to the rubber during the curing operation, accurate conformity of the rubber and any cover fabric to the mold configuration is obtained.

The method and apparatus of the present invention is extremely simple and economical while yet providing the improved belt sleeve manufacture wherein accurate groove and tooth configurations are obtained.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
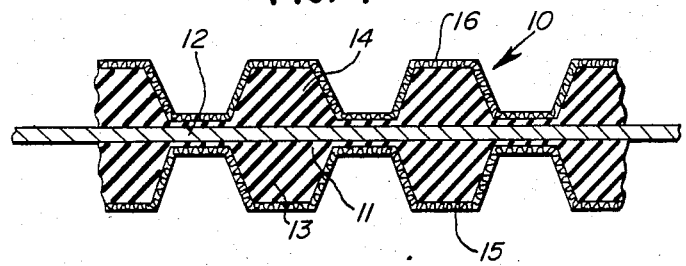
FIG. 1 is a fragmentary longitudinal cross section of a belt sleeve manufactured by the method and apparatus of the invention.

As indicated briefly above, one form of drive belt is provided with grooves or teeth on the inner and outer surfaces thereof. Such a configuration is illustrated in FIG. 1 wherein a belt sleeve 10 is shown to comprise a body 11 formed of synthetic resin, such as polyurethane, rubber, etc. The belt includes a tensile cord 12 for providing longitudinal strength.

The belt further defines longitudinally spaced inner teeth 13 and longitudinally spaced outer teeth 14. In the embodiment of FIG. 1, the teeth 13 and 14 are aligned.

Figure 2:
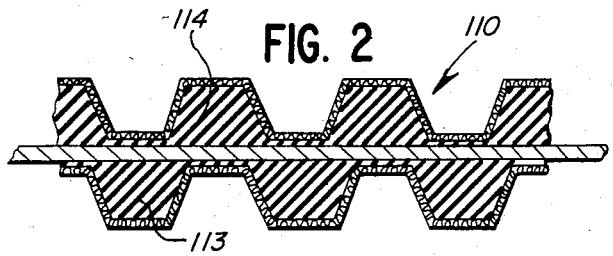
FIG. 2 is a fragmentary cross section of a modified form of belt sleeve manufactured by the method and apparatus of the invention.

As further shown in FIG. 1, the belt sleeve is defined by an inner fabric cover 15 and an outer fabric cover 16. Referring to FIG. 2, a modified form of belt sleeve generally designated 110 is shown to comprise a belt sleeve generally similar to belt sleeve 10 but wherein the inner teeth 113 and outer teeth 114 are disaligned. In each of belt sleeves 10 and 110, however, the teeth are defined by transverse ribs.

Figure 3:
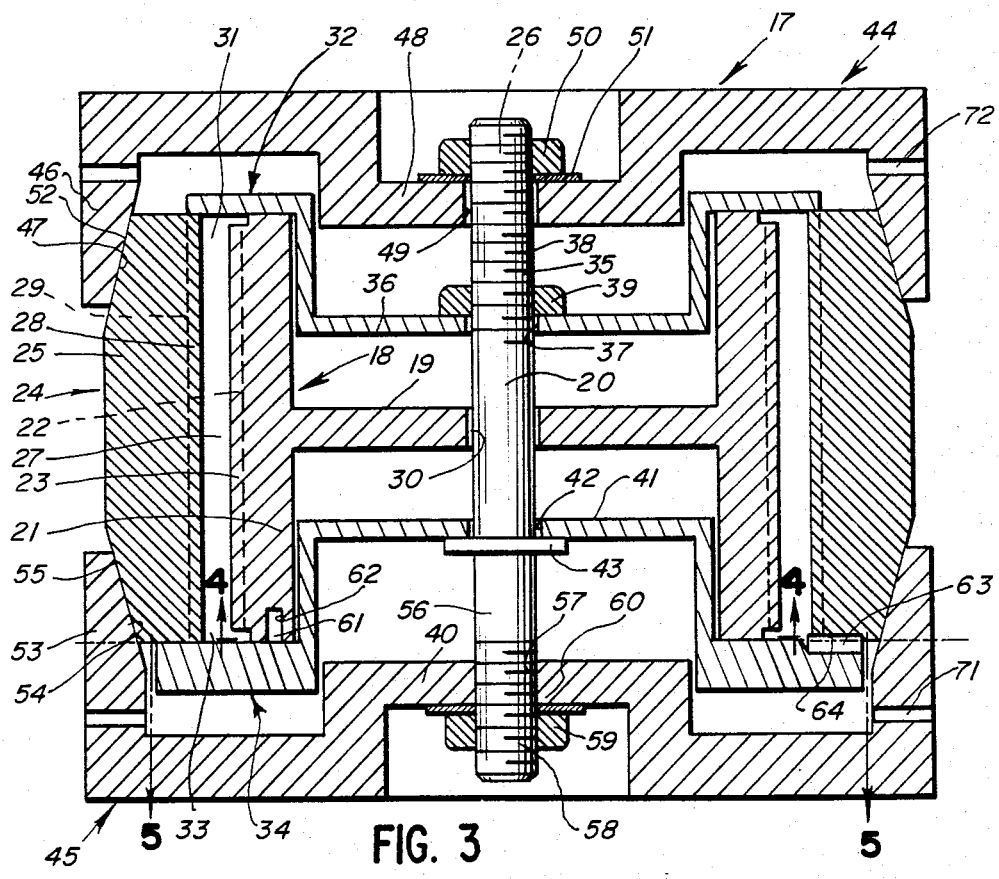
FIG. 3 is a diametric cross section of a molding apparatus embodying the invention.
Figure 4:
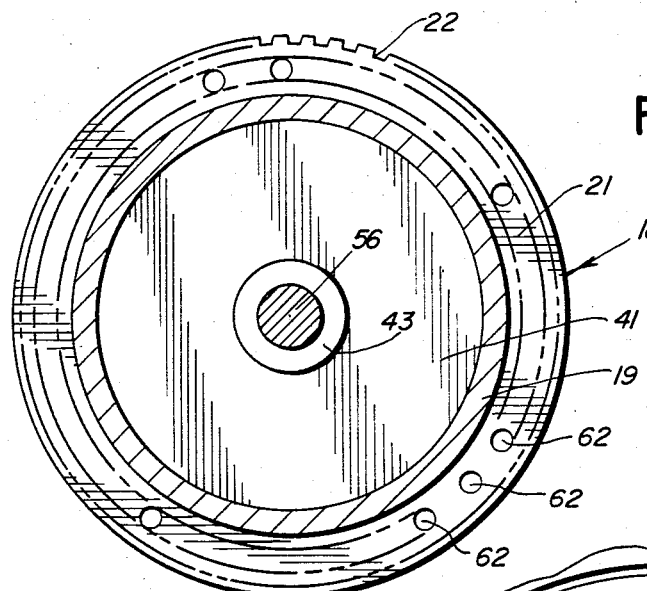
FIG. 4 is a fragmentary transverse section taken substantially along the lines 4—4 of FIG. 3.
Figure 5:
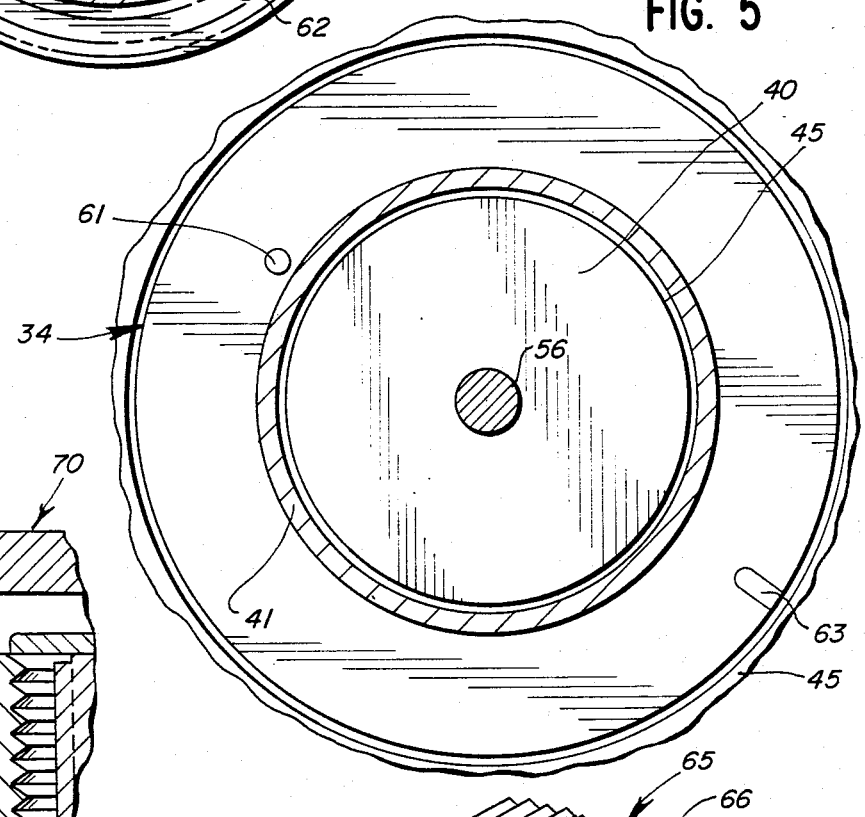
FIG. 5 is a fragmentary transverse section taken substantially along the line 5—5 of FIG. 3.

Referring to FIGS. 3–5, the invention comprehends an improved method of manufacturing such belt sleeves utilizing a novel molding apparatus generally designated 17. As best seen in FIG. 3, apparatus 17 includes an inner mold member 18, including a radially inner support portion 19 carried on a central post 20 of the apparatus. The mold further defines an outer annular portion 21 provided with circumferentially spaced grooves 22 opening radially outwardly in the outer surface portion 23 thereof.

Molding apparatus 17 further includes an outer mold structure generally designated 24 comprising a plurality of annular segments 25. In the illustrated embodiment, four such segments 25 are provided, each extending arcuately approximately 90°. When arrayed about the central axis 26 of post 20 outwardly of inner mold member 18, the segments define an annular outer mold 24 spaced radially outwardly of inner mold surface portion 23 so as to define a molding space 27 therebetween. The radially inner surface portion 28 of mold 24 is provided with a plurality of grooves 29 opening radially toward space 27 in circumferentially spaced relationship about axis 26. Where a belt sleeve 10 is to be formed in apparatus 17, the grooves 29 are aligned with the grooves 22 of the inner mold, and where the belt sleeve 110 is to be formed by apparatus 17, grooves 29 are displaced to be disposed midway between the grooves 22.

Support portion 19 may be provided with a central opening 30 to permit it to be adjustably positioned on post 20, as shown in FIG. 3.

One end 31 of the molding space is closed by a suitable annular closure 32 and the opposite end 33 of the molding space is closed by an annular closure 34. Closure 32 is mounted to one end 35 of the mounting post on a central support 36, having an opening 37 through which the post end 35 extends. Post end 35 is exteriorly threaded at 38 and a nut 39 is threaded thereon to bear against support portion 36 and urge the closure portion 32 sealingly against the ends of molds 18 and 24 at end 31 of the molding space 27.

Closure 34 is mounted to the opposite end 40 of the mounting post by a support portion 41 having an opening 42 through which the post extends. A collar 43 is provided on the mounting post at end 40. Sealing forces directed to closure 32 from nut 39 act through the inner mold portion 21 and, thus, against the lower closure 34 so as to urge support 41 forcibly against collar 43. As shown in FIG. 3, each of supports 36 and 41 is generally cup-shaped.

As indicated briefly above, the outer mold is comprised of a plurality of arcuate segments. The segments are caused to be urged forcibly radially inwardly to define the desired outer mold structure 24 by a pair of opposed pressure plates 44 and 45. Pressure plate 44 defines a depending annular flange 46 having a frustoconical downwardly narrowing pressure surface 47. Pressure plate 44 further defines a support portion 48 having a central opening 49 through which the distal end of the post portion 35 extends. A suitable nut 50 is threaded onto post portion 35 and acts through a suitable washer 51 to urge the flange pressure surface 47 forcibly against a complementary outer frustoconical surface 52 at one end of the outer mold 24.

The opposite pressure plate 45 similarly defines a turned annular flange 53 provided with an inner frustoconical pressure surface 54 which bears against a complementary frustoconical surface 55 at the opposite end of the outer mold structure 24.

Pressure plate 45 is further defined by a support portion 56 having a central hole 57 receiving a threaded lower end portion 58 of the mounting post end 40. A nut 59 is threaded to post portion 58 to act through a washer 60 against the support portion 56, thereby urging the frustoconical surface 54 of flange 53 upwardly against the opposite end of the outer mold structure 24.

Thus, pressure plates 44 and 45 urge the arcuate segments 25 of pressure plate 24 radially inwardly as a result of the axial forces generated therein by the nuts 50 and 59 on the threaded ends of the mounting post 20.

For providing accurate correlation in the disposition of the grooves 22 and 29 of the inner and outer molds, respectively, closure 34 is provided with an upstanding locating pin 61 adapted to fit in a suitable recess 62 in the lower end of the mold 21. Closure 34 is further provided with an upstanding key 63 adapted to be received in a downwardly opening keyway 64 in the lower end of outer mold 24.

As shown in FIG. 4, more specifically, the lower end of the inner mold 21 is provided with a plurality of such recesses 62 permitting the inner mold to be retained in any one of a plurality of different circumferentially related positions. Thus, the grooves 22 of the inner mold may be selectively aligned with grooves 29 of the outer mold to form the belt sleeve 10, or disaligned therewith to form the belt sleeve 110, depending on which hole 62 pin 61 is received in assembling the apparatus.

In forming the belt sleeves 10 and 110, the grooves 22 and 29 extend parallel to the axis 26. In certain belt constructions, such as the belt sleeve construction 65 illustrated in FIG. 6, one or both of the inner and outer grooves may run circumferentially about axis 26. Thus, in belt structure 65, the outer grooves 66 extend longitudinally of the belt structure and the inner grooves 67 extend transversely thereto so as to define transverse ribs similar to the ribs in belt sleeves 10 and 110 discussed above.

Figure 6:
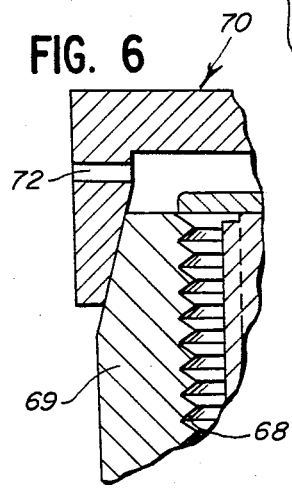
FIG. 6 is a fragmentary perspective view of a modified form of belt sleeve manufactured by modified method and apparatus embodying the invention.
Figure 7:
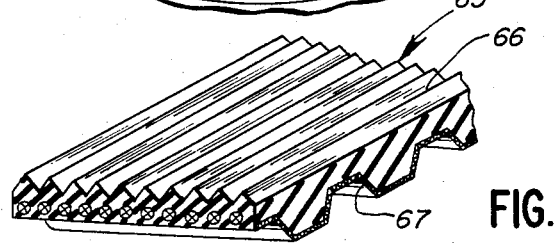
FIG. 7 is a fragmentary diametric section illustrating the modified apparatus for forming the belt sleeve of FIG. 6.

In forming such longitudinal grooves 66, the mold groove 68 in the outer mold 69 extend circumferentially about axis 26 rather than parallel thereto, as illustrated in FIG. 6. In all other respects, the mold apparatus 70 of FIG. 6 is similar to and functions similarly to mold apparatus 17 of FIG. 3.

Industrial Applicability

As indicated briefly above, the present invention comprehends an improved manufacture of ribbed belt sleeves for providing toothed, grooved, or cogged belts. In carrying the manufacture, a fabric layer 15 is provided on the grooved outer surface of the inner mold 21. Uncured rubber sheet material is then wrapped about the fabric, a tensile cord is spirally wound about the rubber sheet, an outer uncured rubber sheet is wrapped about the tensile cord, and an outer fabric 16 is wrapped about the outer rubber sheet. The inner mold, with the laminated layers so disposed thereon, is then mounted to the central post 20 and the nut 39 applied to secure the mold to the post against the collar. The lower closure member 34 is suitably located relative to the inner mold by proper disposition of the pin 61 in the desired locating hole 62.

The outer mold segments are preheated to a temperature of approximately 100° to 120° C. The mold segment having the keyway recess 64 is fitted onto the key 63 carried by the lower closure 34 so as to provide the desired relationship of the grooves of the outer mold to the inner mold, as discussed above, and the other arcuate segments are then installed concentrically about the axis 26 so as to encircle the inner mold. The pressure plates 44 and 45 are then loosely installed and the entire assembly heated to about 100° C. to soften the uncured rubber.

After the rubber reaches the desired softened condition, nuts 50 and 59 are tightened on the threaded ends 38 and 58 of the mounting post so as draw the pressure plates tightly against the outer mold frustoconical surfaces 52 and 55. The inward forcing of the outer mold segments causes the uncured rubber to be forced into the grooves 22 and 29 of the inner and outer molds respectively. Any excess rubber finds its way outwardly through suitable relief passages 71 and 72 in the pressure plate flanges 47 and 53, respectively.

When the outer mold segments have been urged fully into the desired configuration defining mold 24, the entire assembly is loaded into a suitable heating means for curing the rubber at a temperature of approximately 140° to 160° C.

Upon completion of the setting of the rubber, the assembly is removed from the heating means and disassembled by reverse procedure to permit the formed belt sleeve to be removed from the mold. The sleeve may be suitably cut by conventional means into desired widths.

The same procedure is followed where the molding apparatus 70 is utilized to provide longitudinal ribs in the belt.

Thus, the present invention comprehends an improved manufacture of belt sleeves having teeth, cogs or grooves in either or both of the inner and outer belt surfaces. The invention comprehends providing a constrictable outer mold which is forcibly urged radially inwardly so as to compress the belt sleeve preform forcibly to cause accurate engagement thereof with the grooved surfaces of the mold. In the illustrated embodiments, the outer mold comprises a plurality of segments urged radially inwardly by suitable pressure plate means. The pressure plates are urged against the outer mold by threaded means on the central support post of the apparatus for facilitated control of the molding pressure generated thereby.

The apparatus includes means for accurately locating the inner mold relative to the outer mold so as to provide desired relationships between the grooved surfaces produced thereby. The manufacture is advantageously adapted for use in forming toothed, grooved, cogged, etc., belts wherein it is desired to have accurate configurations of the belt surfaces. The manufacture is advantageously adapted for use in forming such belts of rubber with or without covering fabrics.

Manufacture is extremely simple and economical while yet providing high accuracy in the formed belt sleeve structures.

We claim:

1. The method of forming a belt sleeve comprising:
   providing an inner mold having a radially outer surface defining a preselected configuration for forming the inner surface of the desired belt sleeve;
   providing a preform comprising layers of uncured rubber, fabric, and tensile cord concentrically about said inner mold;
   providing end members at the axially opposite ends of said inner mold for effectively defining a molding space concentrically surrounding the inner mold in which said preform is disposed;
   providing in spaced concentric relationship to said inner mold a split outer mold having a radially inner surface defining a preselected configuration for forming the outer surface of the desired belt sleeve;

forcibly urging the outer mold radially inwardly to compress said preform and cause radially inner and outer surfaces thereof to conform accurately to said mold inner and outer surfaces with said mold configuration maintained accurately in a preselected relationship with each other, thereby to form the configurations of the inner and outer surfaces of the belt sleeve preform in correspondingly accurate preselected relationship; and curing said preform while maintaining said urging.

2. The method of forming a belt sleeve of claim 1 comprising the further steps of providing a central mounting post and mounting the inner mold and end members thereto.

3. The method of forming a belt sleeve of claim 1 comprising the further steps of providing a central mounting post and mounting the inner mold and end members thereto, said step of urging the outer mold radially inwardly comprising a step of mounting force transfer means to said post and forcibly urging the force transfer means against said split outer mold.

4. The method of forming a belt sleeve of claim 1 comprising the further steps of providing a central mounting post and mounting the inner mold and end members thereto, said step of urging the outer mold radially inwardly comprising a step of mounting force transfer means to said post and forcibly urging the force transfer means against opposite ends of said split outer mold.

5. The method of forming a belt sleeve of claim 1 including the further step of preheating the outer mold before providing it in concentric relationship to said inner mold.

6. The method of forming a belt sleeve of claim 1 including the further step of providing outlet passages for discharging excess rubber from said molding space as an incident of the compression of said preform.

7. The method of forming a belt sleeve of claim 1 wherein at least one of said mold surfaces is provided with means for forming projections in the confronting surface of the cured belt sleeve.

8. Apparatus for forming a belt sleeve comprising:

an inner mold having a radially outer surface defining a preselected configuration for forming the inner surface of a desired belt sleeve;

end members at the axially opposite ends of the inner mold for effectively defining a molding space concentrically surrounding the inner mold for receiving a preform formed of layers of uncured rubber, fabric and tensile cord;

a split outer mold in spaced concentric relationship to said inner mold having a radially inner surface defining a preselected configuration for forming the outer surface of the desired belt sleeve; and means for forcibly urging the outer mold radially inwardly to compress the preform and cause radially inner and outer surfaces thereof to conform accurately to said mold inner and outer surfaces, said urging means including means for causing the mold configurations to be maintained accurately in a preselected relationship with each other while concurrently curing the preform and maintaining said urging and thereby form the configurations of the inner and outer surfaces of the belt sleeve preform in correspondingly accurate preselected relationship.

9. The apparatus for forming a belt sleeve of claim 8 wherein at least one of the mold surfaces is provided with means for forming projections in the confronting surface of the cured belt sleeve.

10. The apparatus for forming a belt sleeve of claim 8 wherein said inner mold is provided with recess portions for defining projections in the confronting surface of the cured belt sleeve.

11. The apparatus for forming a belt sleeve of claim 8 wherein said outer mold is provided with recess portions for defining projections in the confronting surface of the cured belt sleeve.

12. The apparatus for forming a belt sleeve of claim 8 wherein said inner mold and at least one of said end members are provided with cooperating interlock means for fixed association thereof.

13. The apparatus for forming a belt sleeve of claim 8 wherein said outer mold and at least one of said end members are provided with cooperating radially directed cooperating guide means for guiding said outer mold accurately radially inwardly as an incident of radially inward urging of the mold by said urging means.

14. The apparatus for forming a belt sleeve of claim 8 wherein said outer mold comprises a plurality of arcuate segments.

15. The apparatus for forming a belt sleeve of claim 8 wherein said outer mold defines an outer frusto-conical surface and said means for urging said outer mold radially inwardly comprises means acting against said frusto-conical surface.

16. The apparatus for forming a belt sleeve of claim 8 wherein said outer mold defines an outer frusto-conical surface and said means for urging said outer mold radially inwardly comprises means acting against said frusto-conical surface defining a complementary frusto-conical surface forcibly urged against said outer mold frusto-conical surface as an incident of axial movement of said urging means.

17. The apparatus for forming a belt sleeve of claim 8 further including a central post member and means for coaxially associating the molds and end members therewith.

18. The apparatus for forming a belt sleeve of claim 8 further including a central post member and means for coaxially associating the molds, end members, and means for urging the outer mold radially inwardly therewith.

* * * * *